United States Patent

Lynn et al.

[11] 3,716,619
[45] Feb. 13, 1973

[54] PROCESS FOR RECOVERING CARBON MONOXIDE FROM FUEL GAS

[75] Inventors: James B. Lynn, Bethlehem; Alan H. Singleton, Emmaus, both of Pa.

[73] Assignee: Bethlehem Steel Corporation

[22] Filed: March 19, 1971

[21] Appl. No.: 125,974

[52] U.S. Cl..................................423/247, 260/532
[51] Int. Cl..........................C01b 31/18, C07c 69/06
[58] Field of Search..23/204 M, 2 R, 2 C; 260/449.5, 260/532, 478; 423/247

[56] References Cited

UNITED STATES PATENTS

| 2,117,600 | 5/1938 | Brill et al | 260/532 |
| 2,849,082 | 8/1958 | Giammarco | 23/2 R |
| 2,519,284 | 8/1950 | Ray et al | 23/2 R |

Primary Examiner—Oscar R. Vertiz
Assistant Examiner—Hoke S. Miller
Attorney—Joseph J. O'Keeffe

[57] ABSTRACT

Carbon monoxide is recovered from a fuel gas by compressing a fuel gas containing carbon monoxide and by reacting the carbon monoxide with a lower alkyl alcohol to form alkyl formate. The formate is separated from the fuel gas, and the carbon monoxide is regenerated by decomposition of the formate.

6 Claims, 2 Drawing Figures

PATENTED FEB 13 1973 3,716,619

INVENTORS
James B. Lynn
Alan H. Singleton

BY Joseph J. O'Keefe
ATTORNEY

PROCESS FOR RECOVERING CARBON MONOXIDE FROM FUEL GAS

BACKGROUND OF THE INVENTION

This invention relates to gas separation, and more particularly to the recovery of carbon monoxide from fuel gas.

Carbon monoxide is a common constituent of fuel gases, such as for example, synthesis gas, water gas, steam-hydrocarbon reforming gases, blast furnace gas, etc. Removing and recovering carbon monoxide from fuel gas, either as a step in purifying the fuel gas or, to provide a source of carbon monoxide as a raw material, is well known in the art. However, prior art processes have been generally directed to absorption/desorption processes in which carbon monoxide is absorbed into a solution, usually cuprous chloride or cuprous ammonium solutions, and thus separated from the fuel gas, with which is it associated. Recovery, if desired, is then by desorption.

These prior art methods of carbon monoxide separation and recovery have many disadvantages associated with their use. Absorption/desorption processes are multi-step processes involving expensive equipment and materials. Further, prior art carbon monoxide recovery methods have not readily produced carbon monoxide of high purity.

SUMMARY OF THE INVENTION

This invention discloses a method of recovering carbon monoxide from a fuel gas with which it is associated which obviates the aforementioned prior art problems. A fuel gas containing carbon monoxide is first compressed and then the carbon monoxide present in the fuel gas is reacted with an alkyl alcohol such as methanol in the presence of a corresponding alkali metal alkoxide such as sodium methoxide to form an alkyl formate. The alkyl formate in alcohol solution is fluid, thus easily separated from the residual fuel gas by, for example, venting the fuel gas. Carbon monoxide is regenerated by decomposing the alkyl formate to recover the carbon monoxide and the alcohol. The latter is recycled and reused.

DESCRIPTION OF THE PREFERRED EMBODIMENT

Figure 1:
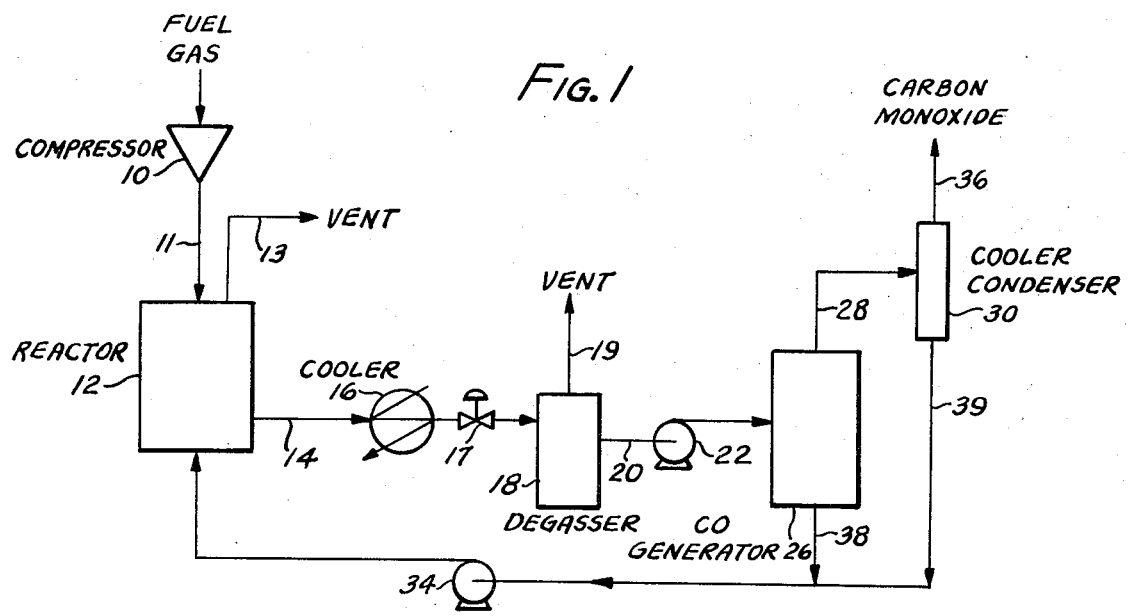
FIG. 1 is a flow diagram of this invention.

Referring to FIG. 1, a fuel gas comprising approximately in molar per cent, 55 percent nitrogen, 25 percent carbon monoxide, 4.5 percent hydrogen and 0.5 percent methane, and from which carbon dioxide and water have been previously removed, enters compressor 10 where it is compressed to a pressure between about 2500 to 5000 psig (the partial pressure of carbon monoxide present is from about 625 to about 1250 psig). From compressor 10 the fuel gas enters reactor 12 by line 11. Reactor 12 contains, in addition to the entering fuel gas, sodium methoxide (NaO CH$_3$) dissolved in methanol (CH$_3$OH) in the ratio of about 1 part by weight sodium methoxide per 100 parts methanol. The temperature in reactor 12 is maintained at about 60° to 100° C. to synthesize methyl formate by carbon monoxide esterification. During esterification, the fuel gas residue is continuously vented through line 13. Methyl formate in a methanol solution leaves reactor 12 by line 14 and enters cooler 16 where the temperature is lowered to about 15° to 20° C. and proceeds from there through pressure reducing metering valve 17 to degasser 18. In degasser 18, the methyl formate-methanol solution pressure is lowered to cause degassing of dissolved contaminant gases. The fuel gas residue thus released is vented from degasser 18 by line 19. The methyl formate-methanol solution leaves degasser 18 by line 20 and proceeds through pump 22 to carbon monoxide generator 26. In carbon monoxide generator 26, the methyl formate-methanol solution is heated to from about 35° C. to about 200° C. to cause the methyl formate ester to decompose, regenerating carbon monoxide and methyl alcohol. The pressure in carbon monoxide generator 26 is preferably maintained the same as in degasser 18. Gaseous products in carbon monoxide generator 26, which include carbon monoxide, methyl formate vapor and methanol vapor, leave carbon monoxide generator 26 by line 28 to cooler/condenser 30. Liquid methanol leaves carbon monoxide generator 26 by line 38 and is recycled by pump 34 to reactor 12.

In cooler/condenser 30 the gases entering through line 28 are cooled to purify, by condensation of the methanol and methyl formate, the carbon monoxide which emerges from cooler/condenser 30 at line 36. Methanol and methyl formate condensate leave cooler/condenser 30 by line 39, and are recycled through pump 34 to reactor 12.

In a specific embodiment of the method of this invention, blast furnace gas comprising in mole percent, 55 percent nitrogen, 40 percent carbon monoxide, 4.5 percent hydrogen and 0.5 percent methane, with water and carbon dioxide removed, was compressed to 2600 psig and reacted with methanol and sodium methoxide in the ratio of 1 part by weight sodium methoxide per 100 parts methanol as described supra. The solution product of the reaction analyzed, on a mole per cent basis, as follows:

methyl formate—67
methanol—25
sodium methoxide—1.0
carbon monoxide—5.0 (dissolved)
nitrogen—2.0
hydrogen—negligible
methane—negligible The product solution from above was degassed by first lowering the temperature to 20° C., followed by lowering the pressure to about 300 psig. The product solution then analyzed, on a mole per cent basis, methyl formate—70.5
methanol—26.3
sodium methoxide—1.0
carbon monoxide—2.0 (dissolved)
nitrogen—about 0.1 to 0.2

Heating the product solution to 55° C. and removing the gaseous product while maintaining solution pressure at 300 psig gave a regenerated gas stream which was then cooled to 15°–18° C. On analysis the gaseous product was found to contain, in mole per cent:

carbon monoxide—95
methyl formate—4.5 nitrogen—0.5

Further cooling of the gaseous product reduced the methyl formate content, producing a final product gas stream which analyzed 99.5 percent carbon monoxide.

Figure 2:
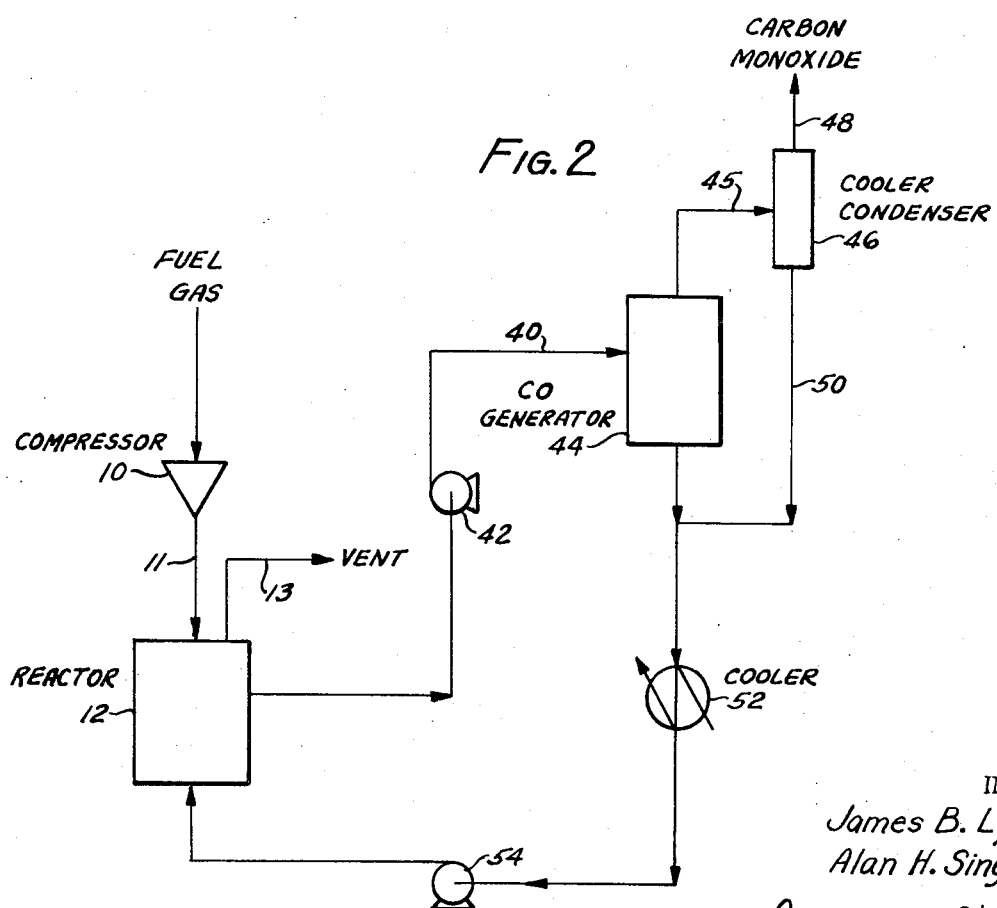
FIG. 2 is a flow diagram of an alternate embodiment of this invention.

An alternate embodiment of the process of this invention is shown in FIG. 2. In FIG. 2 the methyl formate-methanol solution from reactor 12 enters carbon monoxide generator 44 through line 40 and pump 42. Fuel gas residue is vented through line 13, as described above. Carbon monoxide generator 44 is maintained at the same pressure as reactor 12, i.e. 2500-5000 psig in the case of methanol. The temperature in carbon monoxide generator 44 is raised to from about 200° to about 300° C. causing carbon monoxide to regenerate at a pressure above 2500 psig.

Gaseous products from carbon monoxide generator 44 enter cooler/condenser 46 by line 45 where the regenerated carbon monoxide is purified by condensing methanol and methyl formate from the vapors. Product carbon monoxide emerges from cooler/condenser 46 at line 48 while liquid methanol and methyl formate leave cooler/condenser 46 by line 50, and are further cooled in cooler 52 and returned to reactor 12 by pump 54.

Our process is equally applicable to other lower alcohols and their corresponding alkali metal alkoxides, such as for example, ethanol and alkali metal ethoxide, normal and isopropanol, and alkali metal propoxide, the butanols and alkali metal butoxides.

We claim:

1. A process for recovering carbon monoxide from a fuel gas comprising the steps of:
    a. compressing a fuel gas containing carbon monoxide at a pressure of about 2500 psig. to about 5000 psig.,
    b. reacting the compressed fuel gas with a lower alkyl alcohol in the presence of an alkali metal alkoxide to form an alkyl formate at from about 60° C. to about 100° C.,
    c. separating the alkyl formate from the compressed fuel gas, and
    d. decomposing the alkyl formate in the presence of the alkali metal alkoxide at a temperature of about 35° C. to about 200° C. while maintaining the pressure below about 2500 psig. to form lower alkyl alcohol and liberate carbon monoxide therefrom.

2. A process according to claim 1 in which the fuel gas is blast furnace gas.

3. A process according to claim 1 in which the lower alkyl alcohol of step (b) is methanol and the alkali metal alkoxide of step (b) is sodium methoxide.

4. A process according to claim 3 in which the separating step (c) includes cooling the alkyl formate to a temperature of about 15° C. to about 20° C. and venting the compressed fuel gas.

5. The process according to claim 1 further comprising the steps of:
    e. recovering the lower alkyl alcohol formed in step (d) and recycling the lower alkyl alcohol to step (b), and
    f. condensing the lower alkyl alcohol and alkyl formate vapors from step (d) and recycling the lower alkyl alcohol to step (b) and the alkyl formate to step (d).

6. The process according to claim 5 in which the fuel gas is blast furnace gas, the fuel gas in step (a) is compressed to about 2500 psig, the lower alkyl alcohol of step (b) is methanol and the alkali metal alkoxide of step (b) is sodium methoxide, the reacting step (b) is performed in a temperature range of about 60° to 100° C., the separating of step (c) includes cooling the alkyl formate to a temperature of about 20° C. and venting the compressed gas at a pressure of less than about 2500 psig., and the decomposing of step (d) includes heating the alkyl formate in a chamber to a temperature of about 55° C. at a pressure no greater than about 2500 psig.

* * * * *